United States Patent [19]

Masuda

[11] 3,757,836
[45] Sept. 11, 1973

[54] QUICK-CONNECT VALVE FOR USE IN FILLING GAS CYLINDERS

[75] Inventor: Eiji Masuda, Takarazuka, Hyogo-Prefecture, Japan

[73] Assignee: Daido Kogyo Kaisha, Ltd., Nishi-ku, Osaka, Japan

[22] Filed: Nov. 1, 1971

[21] Appl. No.: 194,160

[30] Foreign Application Priority Data

Feb. 3, 1971  Japan.................................. 46/4346

[52] U.S. Cl.............. 141/312, 141/351, 251/149.1, 285/35, 285/315
[51] Int. Cl........................................... F16l 37/28
[58] Field of Search................... 141/311, 312, 319, 141/363, 366, 346, 382–385, 391, 392, 1, 2, 18, 347–362, 386–389; 285/315, 316, 318, 319, 35; 81/72; 269/47, 238; 184/105 C; 251/149.1

[56] References Cited
UNITED STATES PATENTS 2,070,013  2/1937  Krannak............................. 285/316

Primary Examiner—John Petrakes
Assistant Examiner—Frederick R. Schmidt
Attorney—Marshall & Yeasting

[57] ABSTRACT

The valve comprises a tubular stem adapted to engage the central portion of a threaded socket inlet in a gas cylinder. A longitudinally sectioned sleeve surrounds the stem and has a threaded end that fits the threaded socket when expanded. A sleeve support slidably surrounds the stem and has a ferrule on which the sections of the sleeve are pivoted, and a resilient annular member surrounds the sectioned sleeve adjacent to the threaded end thereof, for pivoting the sections of the sleeve on the ferrule to contract the threaded end of the sleeve around the stem. A collar is axially slidable on the sleeve support and has a flared end for engaging the sections of the sleeve to pivot them in opposition to the resilient annular member in order to expand the threaded end of the sleeve into engagement with the threads of the socket.

4 Claims, 2 Drawing Figures

INVENTOR.
EIJI MASUDA
BY
Marshall & Yeasting
Attorneys

QUICK-CONNECT VALVE FOR USE IN FILLING GAS CYLINDERS

BACKGROUND OF THE INVENTION

The invention relates to a quick-connect valve for use in filling gas cylinders.

An ordinary cylinder used to hold a gas under pressure is provided with a threaded socket inlet which leads to a check valve that is held in closed position by the pressure of the gas inside the cylinder.

Heretofore, whenever a gas cylinder was to be charged with gas under pressure, it was necessary to screw a fitting tightly into the threaded socket inlet of the gas cylinder in order to connect the gas cylinder inlet to a supply of gas under pressure. The operation of screwing a fitting into the threaded socket inlet of a gas cylinder has been time-consuming and therefore objectionable under any conditions in which it has been necessary to fill a large number of gas cylinders with gas under pressure in a manufacturing plant or in a refilling station.

SUMMARY OF THE INVENTION

The invention provides a quick-connect valve which makes a perfect gas-tight seal with the threaded socket inlet of a gas cylinder without the necessity of screwing a fitting into the threaded socket. The present valve forms a seal when the valve is simply thrust axially into the threaded socket of a gas cylinder. Moreover, after the operation of filling the cylinder with gas under pressure has been completed, it is not necessary to unscrew a fitting in order to remove the present valve. Whenever the present valve is to be removed from a gas cylinder, a simple axial pull breaks the seal and serves to remove the valve from the threaded socket inlet of the gas cylinder.

The present valve comprises a tubular stem adapted to engage the central portion of a threaded socket inlet in a gas cylinder. A longitudinally sectioned sleeve surrounds the stem and has a threaded end that fits the threaded socket when expanded. A sleeve support slidably surrounds the stem and has a ferrule on which the sections of the sleeve are pivoted, and a resilient annular member surrounds the sectioned sleeve adjacent to the threaded end thereof, for pivoting the sections of the sleeve on the ferrule to contract the threaded end of the sleeve around the stem. A collar is axially slidable on the sleeve support and has a flared end for engaging the sections of the sleeve to pivot them in opposition to the resilient annular member in order to expand the threaded end of the sleeve into engagement with the threads of the socket.

DESCRIPTION OF THE PREFERRED EMBODIMENT

Figure 1:
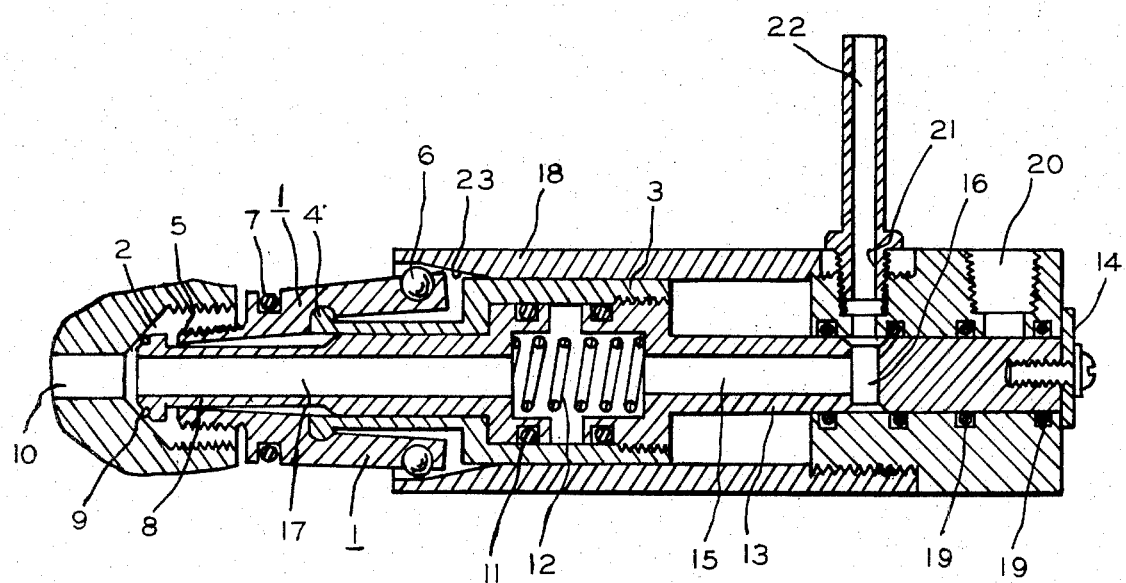
FIG. 1 is a longitudinal section of a valve embodying the present invention, showing the valve as it is about to enter the threaded socket inlet of the gas cylinder.
Figure 2:
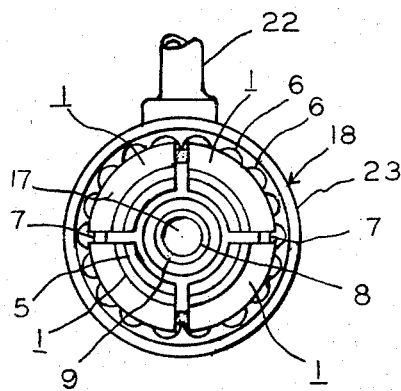
FIG. 2 is an end elevation of the valve.

The connection portion of the present quick-connect valve is a sectioned sleeve consisting of four sections 1 which are adapted to make a connection with a threaded socket inlet 2 of a gas cylinder. The four sections 1 are mounted on a sleeve support 3 having a ferrule 4 on which the four sections 1 are pivoted.

The end of the sectioned sleeve consisting of the four sections 1 is provided with threads 5 which make threaded engagement with the threaded socket 2 when the end of the sectioned sleeve is expanded into engagement with the threaded socket. At the end of the sectioned sleeve, remote from the threads 5, there is provided a ball bearing consisting of balls 6 which are seated in aligned grooves that are formed in the four sections 1.

A resilient annular member 7, consisting of a rubber ring or a coil spring, surrounds the sectioned sleeve beyond the ferrule 4, for pivoting the sections 1 on the ferrule 4 to contract the end of the sleeve. Fig. 1 shows the end of the sectioned sleeve in its contracted position.

Coaxially and slidably mounted in the sleeve support 3 is a tubular stem 8 on the end of which is an O-ring 9 by means of which the tubular stem makes a sealing engagement with the central portion of the threaded socket 2. Such engagement of the tubular stem 8 with the central portion of the threaded socket 2 connects the interior of the tubular stem 8 with an inlet passage of the gas cylinder which leads to a check valve (not shown).

The rear end of the tubular stem 8 is in the form of a piston which is slidable in the cylindrical interior of the sleeve support 3 and is provided with an O-ring 11 which forms a seal between the piston portion of the valve stem 8 and the interior of the sleeve support 3.

A light spring 12 which tends to hold the tubular stem 8 in its outermost position is compressed between the tubular stem 8 and another stem 13 which is threaded into the sleeve support 3. A washer 14 is secured to the end of the stem 13 by means of a screw. The stem 13 is provided with an axial passage 15 which is in communication with the tubular stem 8 and which leads to a transverse passage 16.

Gas under pressure is supplied through the transverse passage 16 and the axial passage 15 of the stem 13 as well as the axial passage 17 of the tubular stem 8 by means of a slide valve mechanism which is threaded to a collar 18 slidably mounted on the sleeve support 3. This valve mechanism is slidably mounted on the stem 13, and is provided with O-rings 19 which form a seal when an inlet 20 is in registry with the transverse passage 16 and also form a seal when an outlet 21 is in registry with the transverse passage 16. The inlet 20 is connected to a hose (not shown) for supplying a gas under pressure, and the outlet 21 is provided with a short outlet tube 22 which discharges into the atmosphere.

FIG. 1 shows the parts in their normal position, in which the outlet 21 is in alignment with the transverse passage 16, and the slide valve assembly is in engagement with the washer 14 which serves as a limiting stop.

In the operation of the device, whenever it is desired to connect the valve to a threaded socket 2 of a gas cylinder, the end of the tubular stem 8 with its O-ring 9 is moved into engagement with the central portion of the threaded socket. Then when axial force is applied to the valve, the light spring 12 is compressed and the sections 1 move into engagement with the flange on the end of the tubular stem 8.

Then as the operator, while gripping the collar 18, applies further axial force, the collar 18 slides along the sleeve support 3, so that the flared end 23 of the collar 18 engages the bearing balls 6. As the collar 18 slides along the sleeve support 3, the adjacent ends of the sections 1 are cammed inward, causing the threads 5 on the opposite ends of the sections 1 to move outward into engagement with the threads of the socket 2.

When the collar 18 reaches the end of its axial movement, the threads 5 on the ends of the sections 1 are firmly engaged with the threaded socket, and the inlet 20 which is supplied with gas under pressure is in alignment with the transverse passage 16 of the stem 13. Gas under pressure then flows through the inlet 20, the transverse passage 16 and the axial passage 15 of the stem 13, and finally through the axial passage 17 to the inlet 10 of the gas cylinder.

It will be recalled that the first effect of inserting the device into the threaded socket 2 was to force the tubular stem 8 inward slightly by compressing the light spring 12. In consequence, the tubular stem 8 remains in its inward-displaced position after engagement of the threads 5 with the threads of the socket 2. The internal pressure in the axial passages 15 and 17 then causes the tubular stem 8 to operate as a piston, causing the tubular stem 8 to be forced strongly toward the left in FIG. 1 so that the O-ring 9 effects a gas tight seal with the central portion of the threaded socket 2.

So long as the collar 18 remains in its extreme left-hand position, the inlet 20 connects the supply of gas under pressure to the inlet 10 of the gas cylinder, and the piston action of the tubular stem 8 maintains a tight seal at the O-ring 9.

When it is desired to disconnect the device from the gas cylinder, the collar 18 to which the valve assembly is threaded is pulled back to the position shown in FIG. 1. At the same time, the outlet 21 with its exhaust tube 22 comes into registry with the transverse passage 16, relieving the pressure in the axial passages 15 and 17. This relieves the tension which has been set up by internal pressure, and the parts immediately return to the positions shown in FIG. 1, permitting the device to be removed instantly from the threaded socket 2.

I claim:

1. A quick-connect valve for use in filling gas cylinders, comprising a tubular stem adapted to engage the central portion of a threaded socket inlet in a gas cylinder, a longitudinally sectioned sleeve which surrounds the stem and has a threaded end that fits such threaded socket when expanded, a sleeve support which slidably surrounds the stem and has a ferrule on which the sections of the sleeve are pivoted, a resilient annular member which surrounds the sectioned sleeve adjacent to the threaded end thereof, for pivoting the sections of the sleeve on the ferrule to contract the threaded end of the sleeve around the stem, and a collar which is axially slidable on the sleeve support and has a flared end for engaging the sections of the sleeve to pivot them in opposition to the resilient annular member in order to expand the threaded end of the sleeve into engagement with the threads of the socket.

2. A quick-connect valve according to claim 1 comprising valve mechanism which is operated by axial movement of the collar and has an inlet for connection to a supply of gas under pressure, in order to supply gas to the tubular stem when the collar is moved into engagement with the sections of the sleeve to expand the end of the sleeve into engagement with the threads of the socket.

3. A quick-connect valve according to claim 2 wherein the tubular stem is mounted on a piston in the sleeve support which is operated by pressure of the supplied gas to force the stem into sealing engagement with the central portion of the threaded socket.

4. A quick-connect valve according to claim 3 wherein the valve mechanism is a three-way valve mechanism which connects the tubular stem to a relief port when the collar is moved out of engagement with the sections of the sleeve.

* * * * *